United States Patent [19]

Harman

[11] 3,938,610
[45] Feb. 17, 1976

[54] AUTOMOTIVE HOOD SAFETY DEVICE

[76] Inventor: Eugene V. Harman, 12649 N. 22nd St., Phoenix, Ariz. 85022

[22] Filed: Feb. 10, 1975

[21] Appl. No.: 548,534

[52] U.S. Cl. .............................. 180/69 C; 180/112
[51] Int. Cl.² ......................................... B62D 25/10
[58] Field of Search ...... 180/69 R, 69 C, 112, 82 R, 180/89 A, 89 R; 296/76

[56] References Cited
UNITED STATES PATENTS

| 3,643,755 | 2/1972 | Gionet et al. | 180/69 C |
| 3,709,316 | 1/1973 | Glance | 180/69 C |
| 3,788,686 | 1/1974 | Rossie et al. | 180/82 R X |
| 3,815,176 | 6/1974 | Porter | 180/69 C X |

Primary Examiner—Robert R. Song
Assistant Examiner—Milton L. Smith
Attorney, Agent, or Firm—Cahill, Sutton & Thomas

[57] ABSTRACT

A pair of safety devices for preventing rearward horizontal movement of a closed automobile hood is disclosed. Each safety device is formed by a retaining arm which extends rearwardly from a frame element within the engine compartment and terminates in a channel. The channel slidably receives and retains the rear edge of the hood when the latter is in the closed position.

6 Claims, 4 Drawing Figures

AUTOMOTIVE HOOD SAFETY DEVICE

The present invention relates to automotive safety devices and, more particularly, to devices for preventing an automobile hood from entering the passenger compartment as a result of a front end collision.

Earlier, the rear edge of automobile hoods was displaced forwardly of the lower edge of the windshield by a panel several inches wide. The panel and its substructure supported the windshield wipers, the jets for the windshield washers and often included louvered sections for ingress of air as part of the built-in ventilation system. In addition to the above purposes, the panel served one very important but often neglected function. The panel acted as a buffer to restrain and impede rearward movement of the hood during front end collisions. That is, in a front end collision, the hood is forced rearwardly. On striking the panel, the hood usually buckled, which buckling tended to direct or flip the hood over the roof of the passenger compartment. Thus, the hood did not usually enter the passenger compartment through the front windshield and cause injury to the driver and passengers.

With the advent of the so-called hidden windshield wipers, the panel intermediate the rear edge of the hood and the windshield was removed. In its place there was formed an uncovered cavity for receiving the windshield wipers when the latter were in the rest position. Hence, no buffer existed intermediate the rear edge of the hood and the windshield. As a result, severe injury and death has resulted from front end collisions by rearward horizontal movement of the hood through the windshield and into the passenger compartment.

In recognition of the problem created by the hidden windshields, several devices have been developed in an attempt to prevent the hood from penetrating the passenger compartment during a front end collision. In example, U.S. Pat. No. 3,815,176, is directed to hinging apparatus which presumptively specifically overcomes the above discussed problem. Another means for ensuring buckling of the hood instead of rearward travel thereof is illustrated in U.S. Pat. No. 3,709,316. A further patent, U.S. Pat. No. 3,643,755, describes a frangible pivot mechanism for a hood which attempts to ensure upward and rearward pivotal movement of the hood rather than horizontal rearward movement.

It is therefore a primary object of the present invention to provide apparatus useable in conjunction with any automobile hood to restrain horizontal rearward movement of the hood.

Another object of the present invention is to provide an inexpensive safety device adaptable to any automobile hood to prevent horizontal rearward travel thereof.

Still another object of the present invention is to provide a safety device for automobile hoods which is pivoted in proximity to the lower edge of the windshield.

Yet another object of the present invention is to provide a safety device for preventing rearward horizontal movement of an automobile hood which does not impinge upon nor affect the normal opening or closing of the hood.

A further object of the present invention is to provide a readily manufacturable safety device for use with automobile hoods.

A still further object of the present invention is to provide a safety device for automobile hoods which is manually attachable with simple tools.

These and other objects of the present invention will become apparent to those skilled in the art as the description thereof proceeds.

The present invention will be described with greater specificity and clarity with reference to the following figures, in which.

Generally, the engine compartment of most cars is essentially rectangular in the horizontal plane, except for the intrusion of the front wheel wells. The framework is generally formed by longitudinal members interconnected by laterally oriented members. Furthermore, angled framework members or braces may be incorporated at various locations depending on both the make and model of automobile. Regardless of the make and model of any car, there usually exists a part of the framework in proximity to the rear corners of the hood. For front opening rear pivoting hoods, the hood pivot or hinge mechanism is generally attached to this part of the framework.

Figure 1:
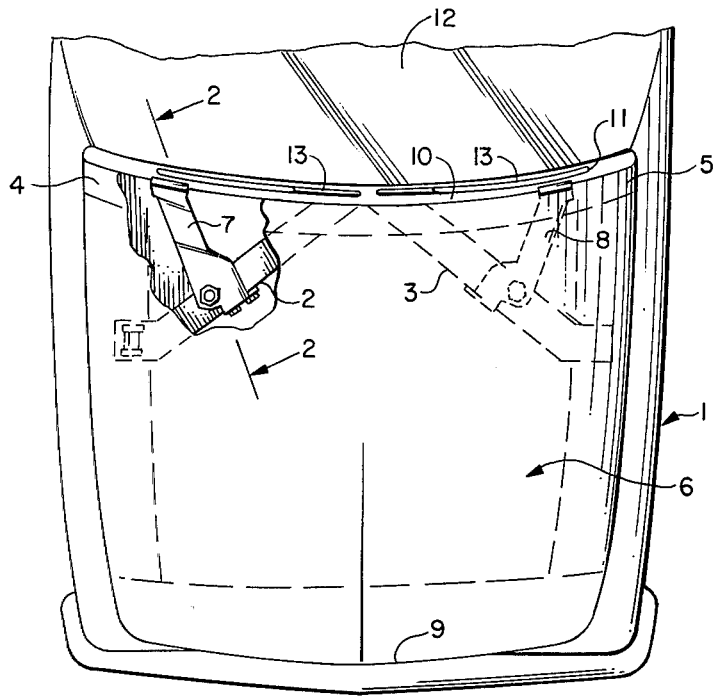
FIG. 1 is a top view illustrating the mounting of the present invention within the engine compartment of an automobile.

Referring now to FIG. 1, there is shown a top view of the engine compartment of a representative automobile 1, which compartment is covered by a rear pivoting hood 6. A pair of rearwardly extending diagonally oriented frame members 2 and 3 extend from the sides of the compartment to the firewall. It is to be clearly understood that frame members 2 and 3 are simply representative of any frame member located in proximity to rear corners 4 and 5 of hood 6. These frame members serve as the anchor points for safety devices 7 and 8 of the present invention.

In most present day cars, the hood 6 is pivotally attached to the framework such that front edge 9 is rotated upwardly while rear edge 10 describes a forward and upward arc. Latch means, not shown, secures the front of hood 6 to the automobile chassis. A cavity 11 is disposed intermediate rear edge 10 and the base of windshield 12. This cavity accommodates the windshield wipers 13 and maintains them out of sight when they are in the rest position. It may therefore be appreciated that when hood 6 is in the closed position, no substantial barrier exists intermediate rear edge 10 and the base of windshield 12. Moreover, the only impediments to a forceful horizontal rearward movement of the hood, such as might occur during a front end collision, are provided by the pivot or hinge mechanism of the hood and the latch.

By employing safety devices 7 and 8, the rear edge 10 is restrained from rearward movement. Such restraint will tend to force hood 6 to buckle. The restraint will also serve as a pivot point of the buckled hood, assuming that the normal hood pivot mechanism has failed. The resulting buckling and upward pivotal movement of hood 6 will tend to carry the hood upwardly and over the roof of the passenger compartment and thereby prevent the hood from penetrating the windshield.

Figure 2:
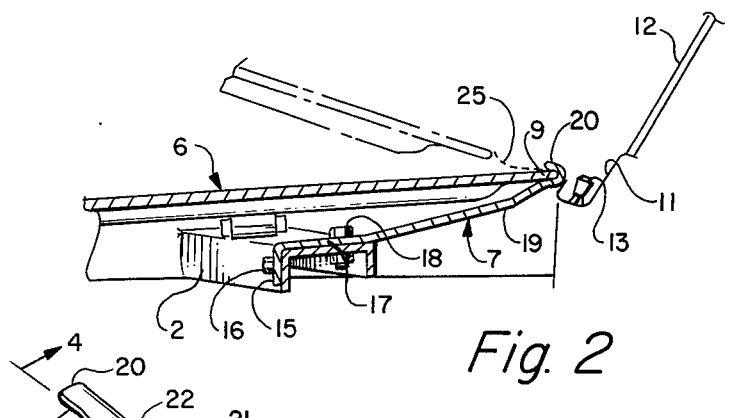
FIG. 2 is a cross-sectional view of the present invention taken along lines 2—2, as shown in FIG. 1.
Figure 3:
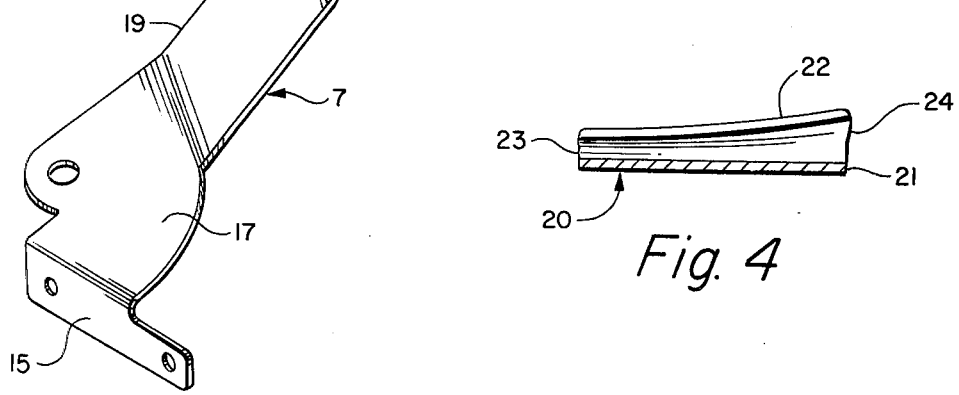
FIG. 3 is a perspective view of the present invention.
Figure 4:
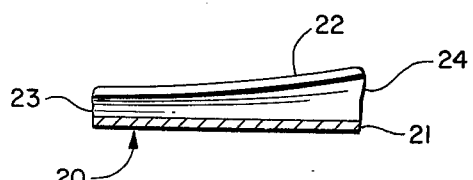
FIG. 4 is a cross-sectional view of a section of the present invention taken along lines 4—4, as shown in FIG. 3.

The structure of the present invention and its relationship to hood 6 is illustrated more succinctly in FIGS. 2, 3 and 4.

Safety device 7 may be formed with a flange 15 for engagement with a vertically oriented section of frame member 2. Bolt means 16 is employable to secure flange 15 to the frame member; alternatively, the flange may be welded. The base 17 of safety device 7 is attached to a horizontal surface of frame member 2 by means such as bolt means 18 or by a weld. A retaining arm 19 extends rearwardly and laterally from base 17 and terminates in a U-shaped channel 20. The orientation and length of retaining arm 19 is primarily dependent upon the relative vertical and horizontal relationship between frame member 2 and edge 10 in proximity to corner 4 of hood 6.

By experimentation, it has been learned that the configuration of base 21 and lip 22 of channel 20 must be in a specific relationship to one another in order to accommodate opening and closing of hood 6 without binding. Preferably, the spacing intermediate base 21 and lip 22 increases non-linearly from side 23 to side 24. Moreover, lip 22 should not be planar but should have an upwardly extending curl of decreasing radial dimension from side 23 toward side 24.

The reasons for such an unusual configuration of channel 20 will become more readily understandable when one considers that rear edge 10 of hood 6 does not generally define a straight line. Instead, it usually extends forwardly and upwardly. Moreover, hood 6 does not pivot about rear edge 10 but pivots about a locus substantially removed therefrom. Thus, the rear edge 10 describes a non-constantly curved path 25 (see FIG. 2) which extends forwardly and upwardly as the hood is pivoted from the closed position to the fully open position (illustrated by phantom lines in FIG. 2). This forward and upward movement, in combination with the non-linear rear edge 10, results in each point along the rear edge describing a slightly different arc. The configuration of channel 20, as described above, accommodates the different arcs defined during insertion and removal of the section of rear edge 10 cooperating with the channel when hood 6 is opened and closed.

While only the configuration of safety device 7 has been described in detail, it is to be understood that safety device 8 is essentially a mirror image thereof and functions in exactly the same manner. Moreover, it is to be understood that flange 15, base 17 and retaining arm 19 may be varied in size and configuration in order to accommodate the differing location of frame members 2 and 3 in different make and model automobiles.

Safety devices 7 and 8 readily receive and release rear edge 10 of hood 6 as the latter is opened and closed. The intrusion of channel 20 into cavity 11, which houses the windshield wipers 13, is essentially limited to the thickness of the material forming the channel and is of no consequence with respect to impeding operation of the windshield wipers. Furthermore, lip 22 may be on the order of a quarter of an inch wide, and if painted in a color matching that of hood 6, will be essentially unnoticed by casual observation.

Should an automobile incorporating the present invention become involved in a front end collision, channels 20 of safety devices 7 and 8 will effectively impede and restrict rearward movement of hood 6. Consequently, the rearward force applied to hood 6 will tend to cause it to buckle and/or pivot about the channels 20. Any resulting pivotal movement will direct the hood up and over the roof of the passenger compartment and inhibit penetration of windshield 12 by the hood.

Because of the stresses and strains which are expected to be imposed upon safety devices 7 and 8 in the event of a front end collision, the safety devices should be made of steel plate having the requisite tensile and bending strengths. Such selection of material is well within the knowledge of those skilled in the art.

By inspection, it may be appreciated that the configuration of the safety devices permits fabrication by mass production stamping and bending techniques. Hence, the costs of manufacture are minimal. Moreover, mounting may be accomplished by skilled or semi-skilled labor.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A safety device attachable to the frame of an automobile for preventing horizontal rearward movement of an automobile hood, said safety device comprising:
    a. a base attachable to the frame of the automobile;
    b. a retaining arm extending rearwardly of said base; and
    c. a forwardly opening channel disposed at the rear of said retaining arm for slidably receiving the rear edge of the automobile hood when the hood is in the closed position, said channel including a further base and a lip and having the spacing intermediate said further base and said lip varying non-linearly from one end of said channel to the other end of said channel.

2. The safety device as set forth in claim 1 wherein the edge of said lip terminates in a laterally outwardly directed curl.

3. The safety device as set forth in claim 1 wherein one of said safety devices is disposed in proximity to each rear corner of the automobile hood.

4. The safety device as set forth in claim 3 wherein said channel of each said safety device engages the rear edge of the automobile hood in proximity to the respective rear corners of the automobile hood.

5. The safety device as set forth in claim 4 including a flange extending from said base for engagement with a mating surface of the frame to provide further support for said retaining arm.

6. The safety device as set forth in claim 5 wherein said base, said retaining arm and said channel are formed of a single sheet of material.

* * * * *